L. WHITCOMB.
FRICTION MEMBER FOR CLUTCHES.
APPLICATION FILED MAY 31, 1907.

1,081,998.

Patented Dec. 23, 1913.

Witnesses.
C. H. Garnett
J. Murphy

Inventor:
Lawrence Whitcomb
by Jas. H. Churchill
Atty.

UNITED STATES PATENT OFFICE.

LAWRENCE WHITCOMB, OF BROOKLINE, MASSACHUSETTS, ASSIGNOR TO THE CORK INSERT COMPANY, OF BOSTON, MASSACHUSETTS, A CORPORATION OF MASSACHUSETTS.

FRICTION MEMBER FOR CLUTCHES.

1,081,998.      Specification of Letters Patent.      Patented Dec. 23, 1913.

Application filed May 31, 1907. Serial No. 376,576.

*To all whom it may concern:*

Be it known that I, LAWRENCE WHITCOMB, a citizen of the United States, residing in Brookline, county of Norfolk, and State of Massachusetts, have invented an Improvement in Friction Members for Clutches, of which the following description, in connection with the accompanying drawings, is a specification, like letters on the drawings representing like parts.

This invention relates to a friction member especially designed among other uses, to be employed with the coöperating members of loom and other clutches.

Loom clutches as now commonly constructed are made as light as possible so as to enable the loom to be started and stopped substantially in an instant, and one of the members of said clutches is provided with a facing of leather to obtain a better frictional engagement between the members.

The present invention has for its object to provide clutches of the class described with a friction member as will be described, which replaces the leather facing, thereby avoiding the defects thereof as will be described and materially increasing the frictional engagement of the clutch members without increasing the thickness and weight of the metallic members of the clutch. For this purpose I employ a friction member comprising a ring or washer of light, rigid, non-stretchable and substantially stiff, non-metallic material such as fiber board, leather board or straw board, having a plurality of holes or openings which are filled with inserts of cork in its natural state, forced into the said openings and retained therein by the expansion of the cork. The ring or washer constitutes a holder for the cork inserts, which latter may be allowed to project beyond the side of the ring, and said holder by reason of its physical characteristics may be made of sufficient thickness to receive inserts of the desired or proper length, without adding any material weight to the clutch member to which it may be secured, thereby enabling the clutch to be operated with a minimum power and the loom to be started and stopped substantially in an instant, while at the same time enabling the clutch to transmit a maximum amount of power to the loom, with the result that the power required for operating the loom is materially diminished. These and other features of this invention will be pointed out in the claims at the end of this specification.

Figure 1:
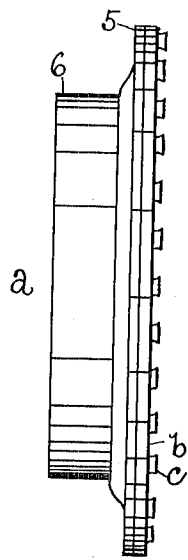
Figure 2:
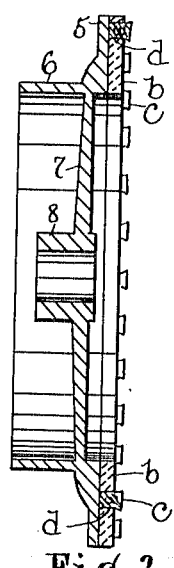
Figure 3:
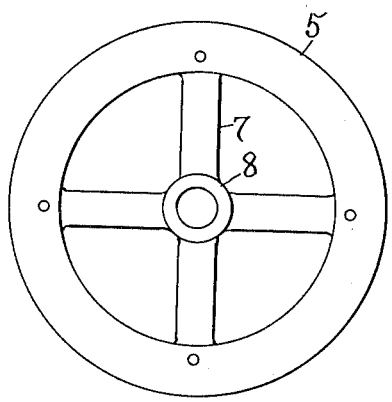
Figure 4:
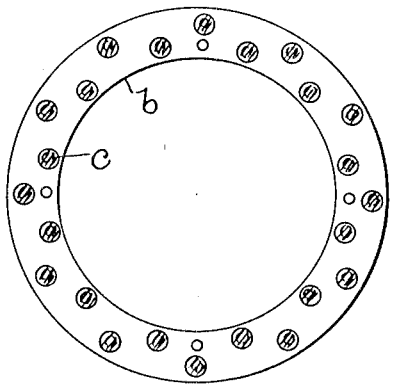

Figure 1 is an elevation of one member of a loom clutch provided with a friction member embodying this invention. Fig. 2, a vertical central section of the member shown in Fig. 1. Fig. 3, a front elevation of the metallic member or spider shown in Fig. 1, and Fig. 4, a front elevation of the friction member detached from the metallic member.

Referring to the drawing $a$ represents one metallic member of a loom clutch embodying this invention. The member $a$ is made as light as possible and for this purpose is composed of a thin annular flange 5 on a rim 6 connected by arms 7 to a hub 8, which parts constitute a metal spider. In order to increase the friction efficiency of the metal member $a$ with its coöperating metal member not herein shown, as it may be of any suitable or desired construction, without increasing the thickness or weight of the member $a$, in order to provide for sockets of sufficient depth to hold the cork inserts, I have provided a friction member comprising a ring, disk or washer $b$ of fiber board, leather board, straw board or other similar light but firm or substantially stiff, non-metallic material of suitable thickness to receive and hold a plurality of inserts $c$ of cork in its natural state, which inserts are forced under compression into sockets or openings $d$ in the member $b$, and are retained therein by the expansion of the cork. The cork inserts $c$ may be made slightly longer than the length of the openings $d$ so as to initially project slightly beyond the face of the fiber ring or washer $b$ and make contact with the coöperating metal member of the clutch. The fibrous friction member comprising the ring or washer $b$ and its cork inserts $c$ may be riveted, pinned, cemented or otherwise attached to the flange 5 of the metal member $a$.

By providing the clutch with a firm, dense, non-metallic fibrous member having inserts of cork, the metal members of the clutch may be made thin to obtain the desired lightness necessary to enable momentum to be overcome in stopping the loom, and to enable the loom to be started in operation substantially in an instant with a minimum power, while at the same time the gripping or frictional efficiency of the clutch is largely increased, which enables the loom to be operated with a minimum power.

The ring, washer or disk *b* is made of a non-metallic material, such as above described, which is light, rigid and non-stretchable, so that the walls of the sockets are not distorted and the ring or washer thrown out of shape when the holes are formed and the cork sections are inserted therein, and which resist the expansion of the cork and the lateral strain placed upon the corks when the rotating clutch member is engaged with the coöperating clutch member, yet which material is of such light nature as to enable the ring, disk or washer to be made of sufficient thickness to receive and hold substantially long corks without adding any material weight to the clutch member *a*. So also the fiber board material of which the ring, disk or washer is composed, is of such stiffness as to enable the same to be filled with cork inserts and preserve its shape, so that it can be manufactured and shipped in condition to be applied to the clutch member. Furthermore the friction member can be made and sold at a very low price, which enables manufacturers to apply the same to clutches now in use both for looms and other machines with beneficial results, not only in starting and stopping the machine but also in the amount of power required to run the machine.

The leather facing commonly used in loom and other clutches is objectionable as a frictional surface, for the reason that it is affected by moisture and oil, which reduces the coefficient of friction, and also necessitates frequent adjustment of the clutch members to prevent slipping or too sudden gripping of the said members, and further requires frequent cleaning to keep it in proper working condition. These objectionable features are avoided by the use of the friction member herein described.

Claims:

1. The combination with a metallic clutch member having a substantially thin annular flange, of a friction member coöperating with said annular flange and comprising a ring, washer or disk of fiber board having a plurality of holes or openings, and inserts of cork fitted into said holes or openings under compression and retained therein by the expansion of the cork, said fiber board being light, substantially thick and of a firmness or rigidity to enable a large number of holes to be drilled in it without materially impairing its firmness or rigidity and without distortion of the walls of the said holes and to enable the said walls to resist the expansive action of the cork and the lateral strain placed upon the cork in use, substantially as described.

2. A friction member for clutches comprising a ring, washer or disk of fiber board having a plurality of holes or openings, and inserts of cork fitted into said holes or openings under compression and retained therein by the expansion of the cork, said fiber board being light, substantially thick and of a firmness or rigidity to enable a large number of holes to be drilled in it without materially impairing its firmness or rigidity and without distortion of the walls of the said holes and to enable the said walls to resist the expansive action of the cork and the lateral strain placed upon the cork in use, substantially as described.

In testimony whereof I have signed my name to this specification in the presence of two subscribing witnesses.

LAWRENCE WHITCOMB.

Witnesses:
   Jas. H. Churchill,
   J. Murphy.